US012465844B2

(12) United States Patent
Fortier

(10) Patent No.: US 12,465,844 B2
(45) Date of Patent: Nov. 11, 2025

(54) GAMECARD HOLDER AND ORGANIZER

(71) Applicant: Bobbie C. Fortier, Katy, TX (US)

(72) Inventor: Bobbie C. Fortier, Katy, TX (US)

( * ) Notice: Subject to any disclaimer, the term of this patent is extended or adjusted under 35 U.S.C. 154(b) by 571 days.

(21) Appl. No.: 17/966,132

(22) Filed: Oct. 14, 2022

(65) Prior Publication Data

US 2023/0117039 A1 Apr. 20, 2023

Related U.S. Application Data

(60) Provisional application No. 63/340,172, filed on May 10, 2022, provisional application No. 63/255,815, filed on Oct. 14, 2021.

(51) Int. Cl.
*A63F 1/10* (2006.01)
*A63F 3/06* (2006.01)
*H02J 7/00* (2006.01)

(52) U.S. Cl.
CPC ................ *A63F 3/069* (2013.01); *A63F 1/10* (2013.01); *H02J 7/0044* (2013.01)

(58) Field of Classification Search
CPC ........................................................ A63F 1/10
See application file for complete search history.

(56) References Cited

U.S. PATENT DOCUMENTS 1,594,754 A * 8/1926 Reines .................... A47F 7/145 108/61
2,742,292 A * 4/1956 Mcdonough .............. A63F 1/10 40/124.4
2,785,901 A * 3/1957 Mclemore ................. A63F 1/10 D19/91
4,684,132 A * 8/1987 Wolford .................... A63F 1/10 40/124
D353,412 S * 12/1994 Bull ............................. D21/392
D397,735 S * 9/1998 Spranger ............................ 5/639
D439,622 S * 3/2001 Golad .......................... D21/392
D478,942 S * 8/2003 Goltz ........................... D21/392
9,010,758 B1 * 4/2015 Malmloff .................. A63F 1/10 273/148 A
D860,326 S * 9/2019 Vanacore ..................... D21/392
D900,940 S * 11/2020 Wu ............................. D21/392
11,759,006 B2 * 9/2023 O'Brien ................. A47B 21/06 211/10
12,090,387 B1 * 9/2024 Ballam ..................... A63F 1/10

(Continued)

*Primary Examiner* — Jay Trent Liddle
(74) *Attorney, Agent, or Firm* — Intellectual Property Consulting, LLC; Stephen M. Kepper

(57) ABSTRACT

A gamecard holder comprising a bottom surface, a back surface, opposing sides, and a front viewing portion that collectively form an elevated holder that is operable to be placed on any table or comparable surface. The front viewing portion includes a plurality of slots operable to hold various pull-tabs or game cards. The front viewing portion faces the player and is configured such that the height along the front viewing portion increases towards the back surface of the holder such that the pull-tabs, when placed in the slots, are viewable to the player. Optionally, the holder may include a retractable stand operable to transition the holder from a raised position ideal for playing games to a closed position for storing. As an additional option, the holder may include a support assembly for holding a portable electronic device as well as a power source and charging station.

6 Claims, 10 Drawing Sheets

(56) References Cited

U.S. PATENT DOCUMENTS

| | | | | |
|---|---|---|---|---|
| 2003/0234494 | A1 * | 12/2003 | Braun | A63F 1/10 273/309 |
| 2017/0049200 | A1 * | 2/2017 | Audet | B43M 99/008 |
| 2021/0060409 | A1 * | 3/2021 | Stockman | A63F 1/10 |

* cited by examiner

GAMECARD HOLDER AND ORGANIZER

RELATED APPLICATIONS

This application claims priority to U.S. Provisional Application No. 63/255,815 filed Oct. 14, 2021 and U.S. Provisional Application No. 63/340,172 filed May 10, 2022. The entire contents of the above application are hereby incorporated by reference as though fully set forth herein.

FIELD

The present invention relates in general to game accessories and holders, and in particular, to an apparatus for holding and organizing pull-tab tickets.

BACKGROUND

A pull-tab is a gambling ticket for a pull-tab game. Other names for the game include Break-Opens, Nevada Tickets, Cherry Bells, Lucky 7s, Pickle Cards, Instant Bingo, Bowl Games, or Popp-Opens. A typical pull-tab ticket includes a multi-layered paper ticket containing symbols hidden behind perforated tabs. The player opens the perforated windows on the ticket to reveal a winning combination. The player turns in the winning ticket for a prize.

Pull tabs have become a way of life for bingo halls to supplement their income. It is also a means for the bingo player to win extra money, extra prizes, and extra pull tabs during each bingo session. Pull tabs can pay out a few dollars to thousands of dollars. A bingo hall can sell from fifteen (15) to twenty-five (25) pull tabs per session.

Each player typically has a volume of pull tabs in play at any given time (as shown in FIG. 3), and it is important for each player to be able to visibly see each ticket and have access to it while playing. Although the pull tabs are relatively small in size, a player often struggles to keep them organized and visible on the limited amount of table space provided to each player. Accordingly, there is a need for an improved means to hold and organize the pull tabs and any other gaming cards so that they can all remain visible and accessible at all times.

BRIEF SUMMARY OF THE INVENTION

The disclosed holder and organizer for pull-tabs provides a solution to the problems and needs existing in the prior art. The holder comprises a bottom surface, a back surface, opposing sides, and a front viewing portion that collectively form an elevated holder that is operable to be placed on any table or comparable surface. The front viewing portion includes a plurality of slots operable to hold various pull-tabs. The front viewing portion faces the player and is configured such that the height along the front viewing portion increases towards the back surface of the holder such that the pull-tabs, when placed in the slots, are viewable to the player. Optionally, the holder may include a retractable stand operable to transition the holder from a raised position ideal for playing games to a closed position, making it easier to store the holder when not in use. As an additional option, the holder may include a support assembly for holding a portable electronic device as well as a power source and charging station.

DETAILED DESCRIPTION

Figure 1:
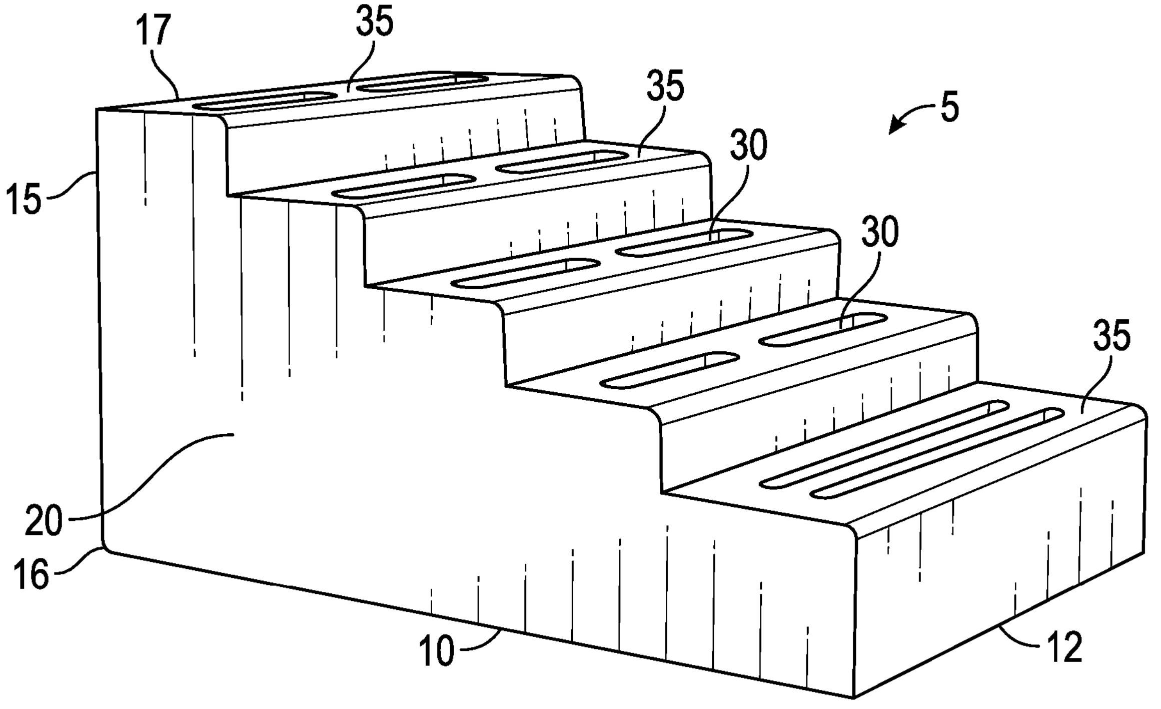
FIG. 1 is a side perspective view of a first embodiment of the invention.
Figure 2:
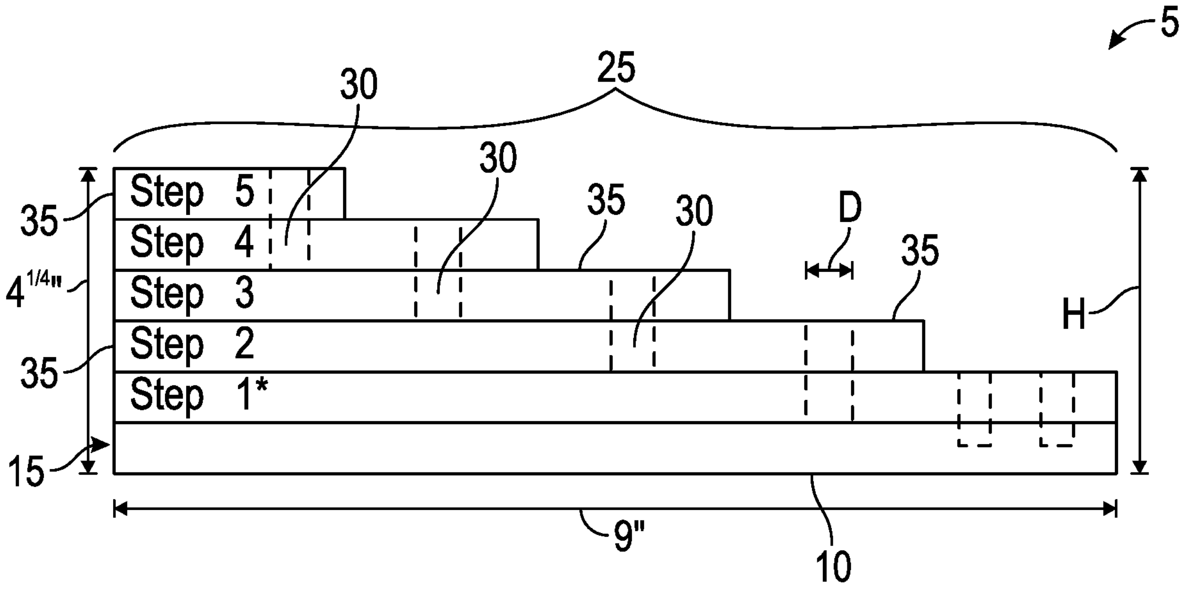
FIG. 2 is a side cross-sectional diagram of a first embodiment of the invention.
Figure 3:
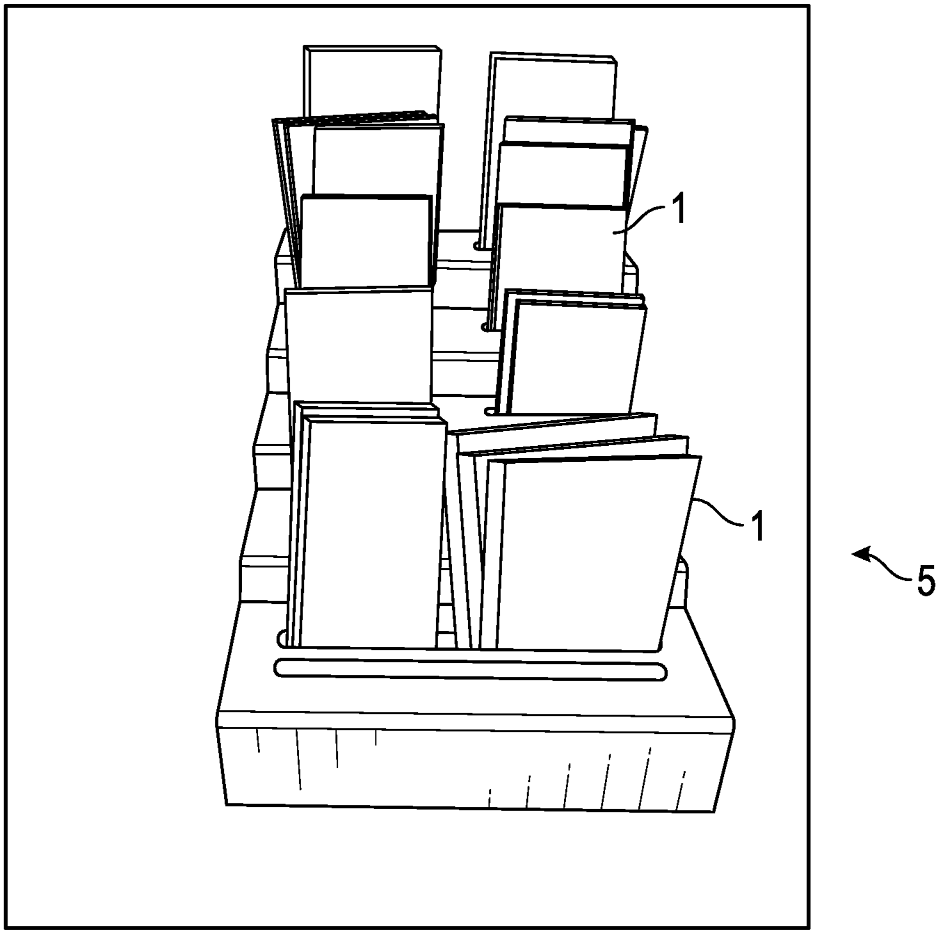
FIG. 3 is a front view of a first embodiment of the invention showing placement of the pull-tabs.

Turning to FIGS. 1-3, a gamecard holder 5 operable to hold and organize pull-tabs or any type of gamecards (hereinafter, collectively referred to as "pull-tabs") 1 is shown. The gamecard holder 5 comprises a back surface 15 disposed between a bottom edge 16 and a top edge 17, a bottom surface 10 disposed between the bottom edge 16 and a front edge 12, opposing sides 20, and a front viewing portion 25 that collectively form an elevated holder 5 that is operable to be placed on any table or comparable surface. The front viewing portion 25 is configured to face the player (not shown) and includes a plurality of slots 30 operable to hold a plurality of pull-tabs 1 (as shown in FIG. 3), such that the pull-tabs 1 are viewable to the player. The front viewing portion 25 is configured such that the height H (as shown in FIG. 2) of the front viewing portion 25 increases towards the back 15 of the holder 5 (and away from the player), such that a "stadium seating" effect is created with the pull-tabs 1 placed in the slots 30.

As shown in FIGS. 1-3, the front viewing portion 25 may be configured to include a plurality of steps 35 with each step 35 having one or more slots 30. While this is a preferred configuration, it is understood that the front viewing portion 25 need only be configured to display the pull-tabs 1 in a staggered, elevated format. Accordingly, the front viewing portion could be beveled, contoured, or some other comparable configuration such that the height H of the front viewing portion 25 where the slots 35 are positioned increases towards the back 15 of the holder 5. An exemplary configuration of the holder 5 includes a bottom surface 10 that is six (6) inches wide, nine (9) inches long, and back surface 15 that is four and one-fourth (4¼) inches tall.

For any embodiment, the number and size of the slots 30 is scalable to accommodate pull-tabs 1 of various shapes and sizes. The depth D (as shown in FIG. 2) of each slot 35 is scalable to accommodate a larger number or smaller number of pull-tabs 1. In the exemplary embodiment shown in FIGS. 1-3, each slot 30 is operable to hold up to fifteen pull-tabs 1.

Figure 4:
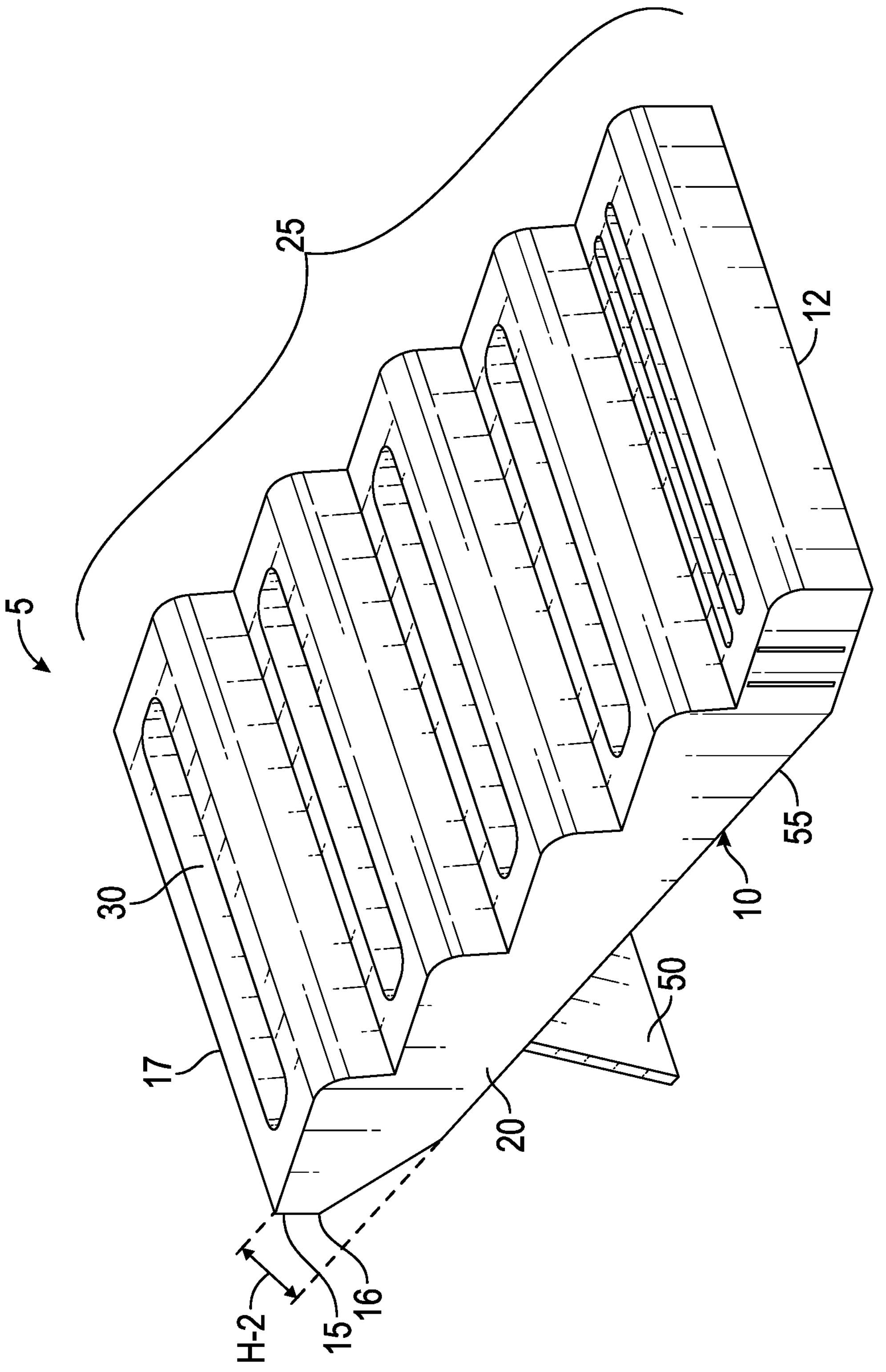
FIG. 4 is a front perspective view of a second embodiment of the invention showing the stand in an open position.
Figure 5:
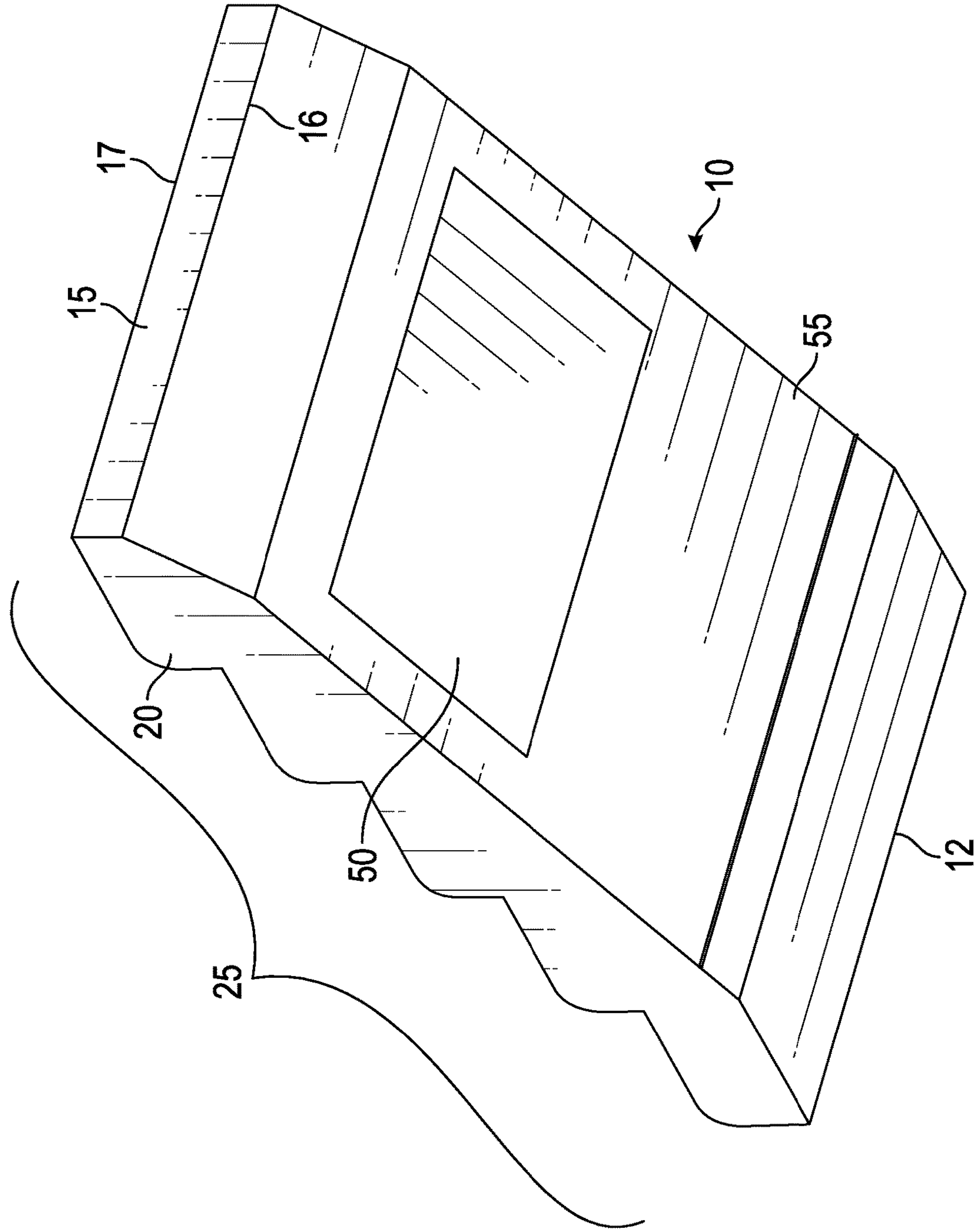
FIG. 5 is a bottom perspective view of a second embodiment of the invention showing the stand in a closed position.
Figure 6:
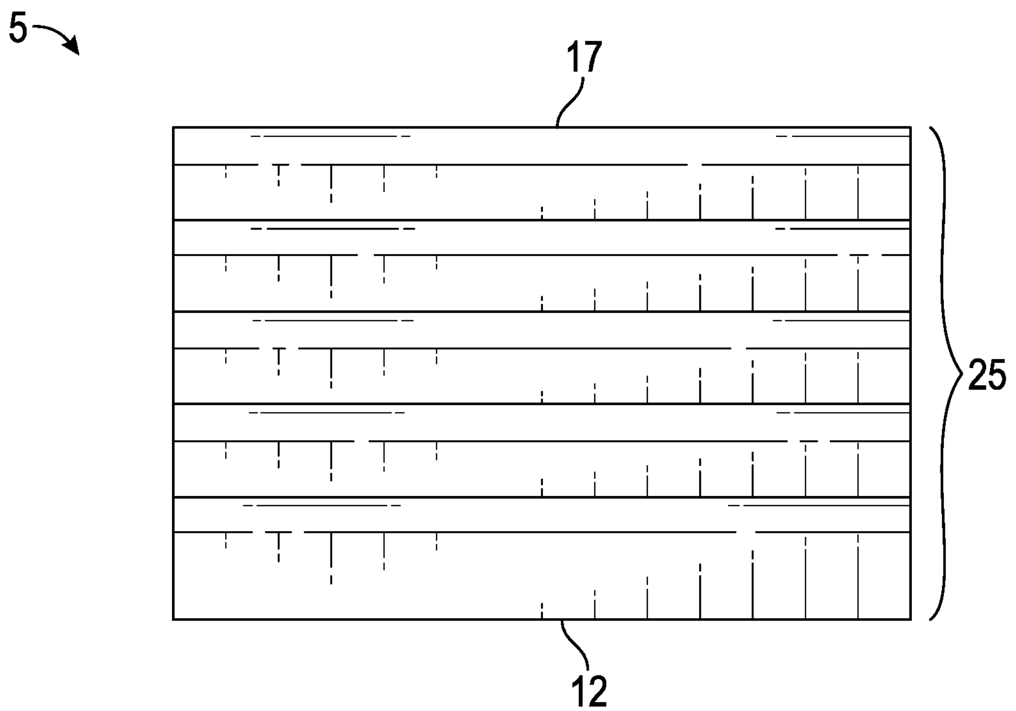
FIG. 6 is a front view of a second embodiment of the invention.
Figure 7:
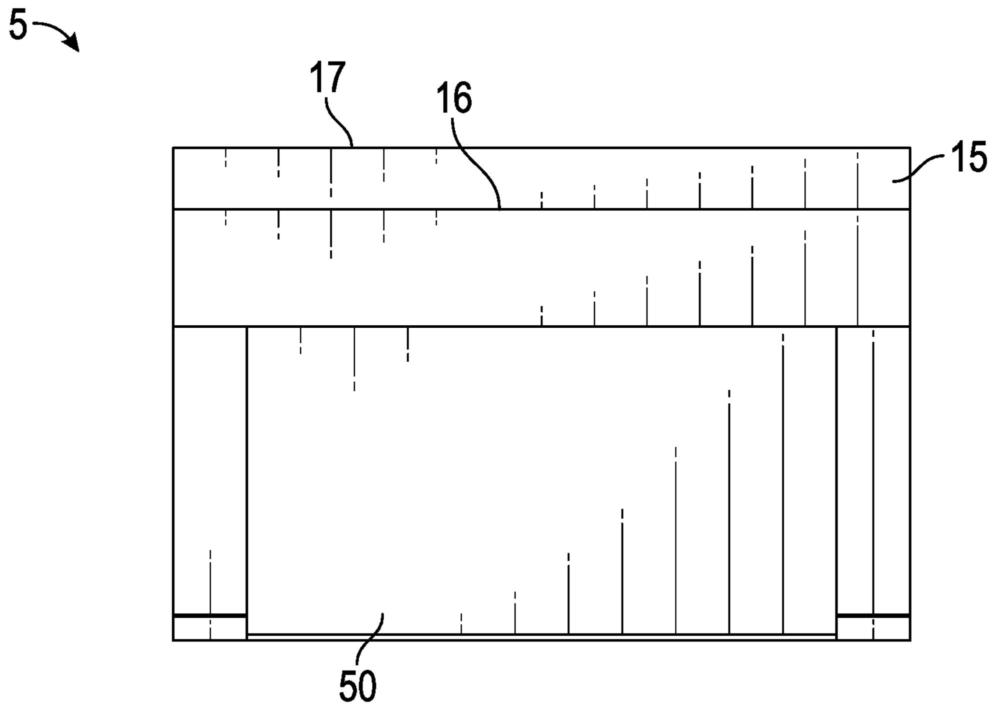
FIG. 7 is a back view of a second embodiment of the invention.
Figure 8:
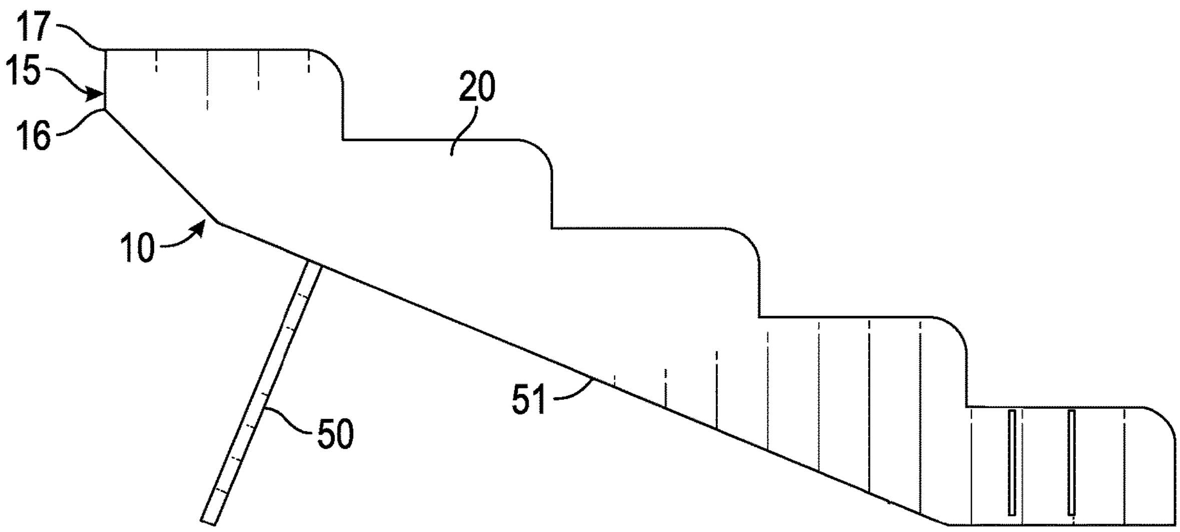
FIG. 8 is a side view of a second embodiment of the invention.
Figure 9:
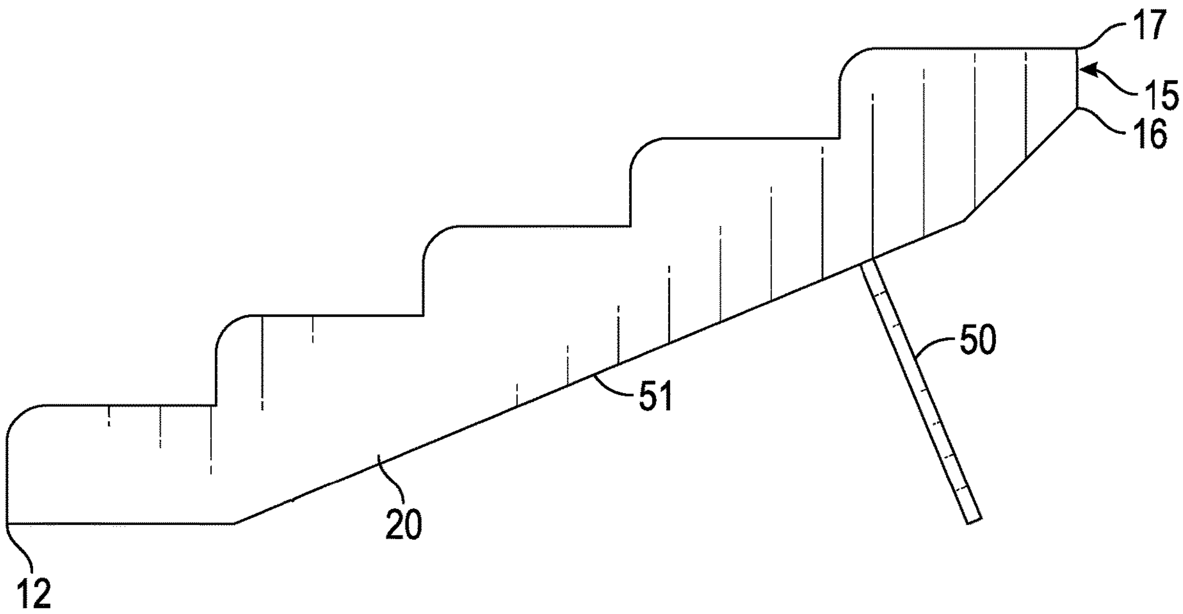
FIG. 9 is an opposing side view of a second embodiment of the invention.
Figure 10:
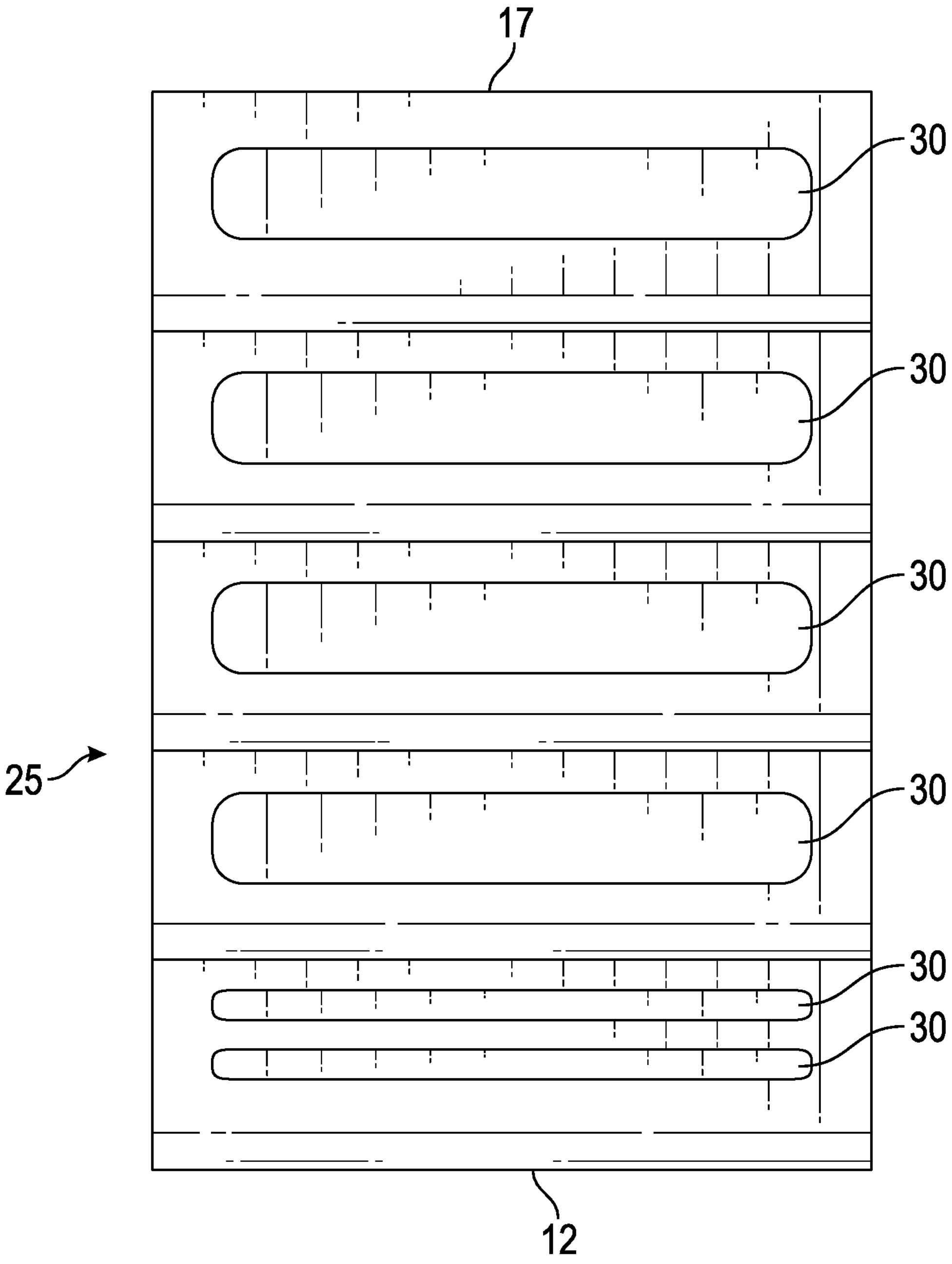
FIG. 10 is a top view of a second embodiment of the invention.
Figure 11:
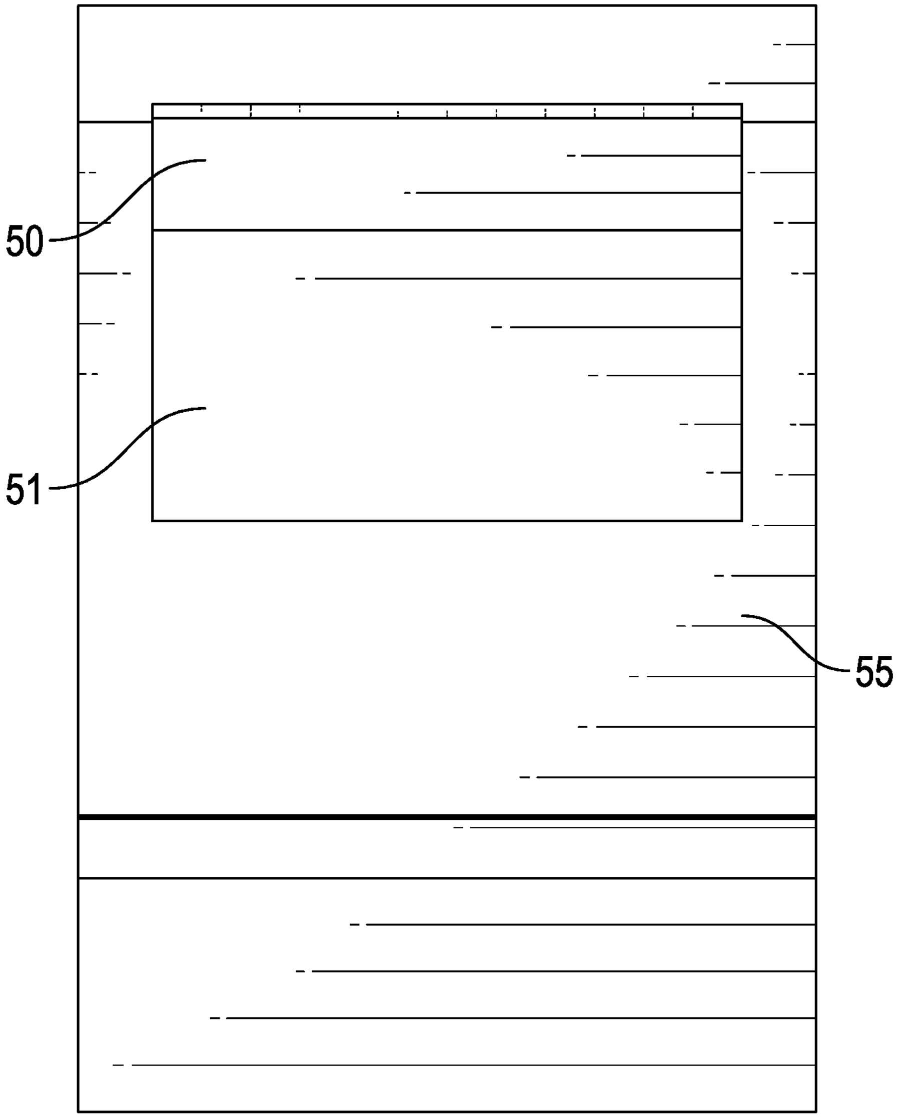
FIG. 11 is a bottom view of a second embodiment of the invention.
Figure 12:
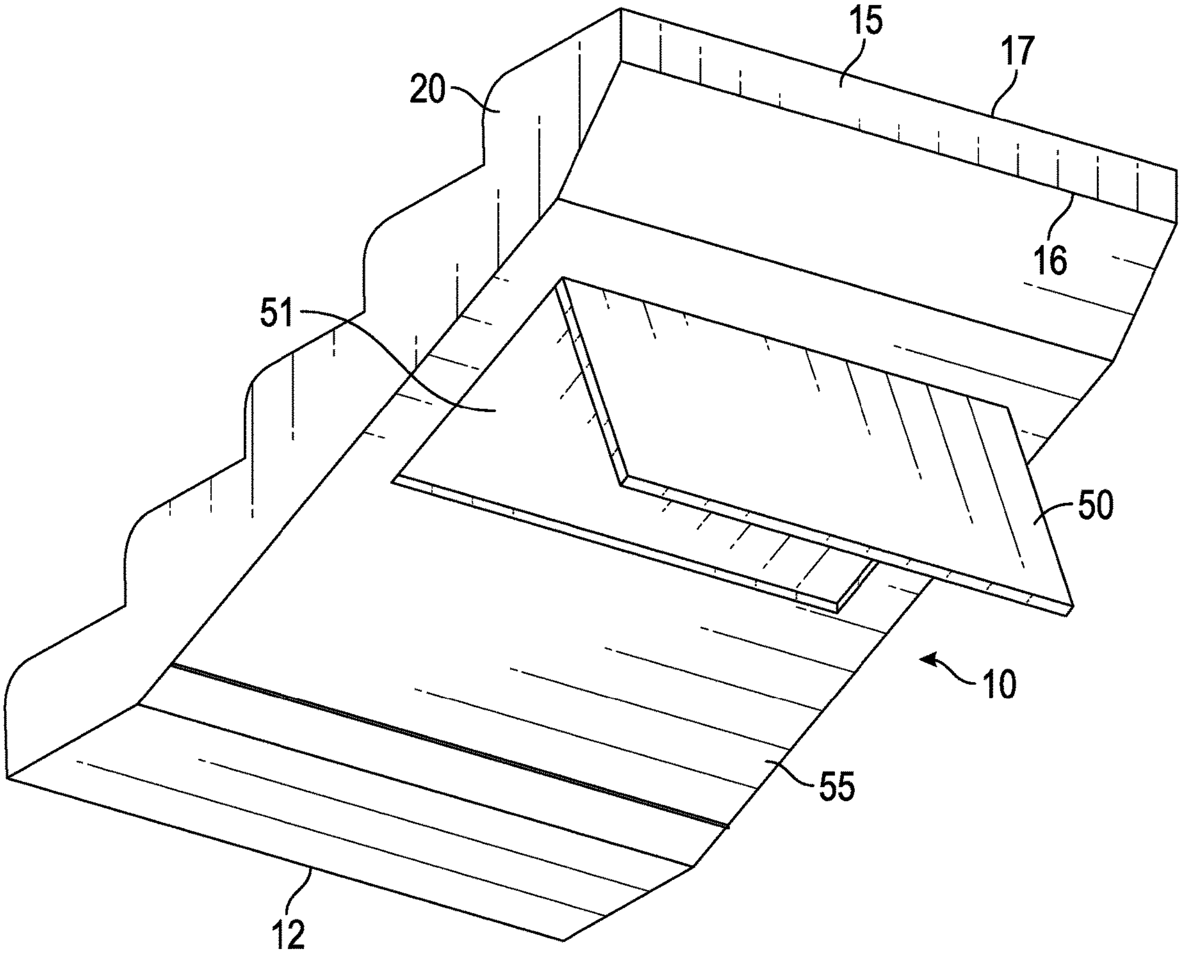
FIG. 12 is a bottom perspective view of a second embodiment of the invention.

Turning to FIGS. 4-13, a second embodiment of the holder 5 is shown. Like the previous embodiment, the holder 5 comprises a back surface 15 disposed between a bottom edge 16 and a top edge 17, a bottom surface 10 disposed between the bottom edge 16 and a front edge 12, opposing sides 20, and a front viewing portion 25 that collectively form an elevated holder 5 that is operable to be placed on any table or comparable surface. The front viewing portion 25 is configured to face the player (not shown) and includes a plurality of slots 30 operable to hold a plurality of pull-tabs 1, such that the pull-tabs 1 are viewable to the player. Unlike the previously disclosed embodiment, this holder 5 is operable to transition to a raised position (as shown in FIG. 4) ideal for playing games from a lowered position (as shown in FIG. 5) where the bottom surface 10 is configured to rest on a relatively flat surface and the overall height H-2 of the holder is reduced, making it easier to store the holder 5 while not in use. The bottom surface 10 includes a retractable stand 50 that is configured to operate between an open position and a closed position. In the open position, the stand 50 is configured to provide support to the bottom surface 10 of the holder 5, as shown in FIG. 4. As shown in FIG. 12, the bottom surface further includes a recess 51 disposed within a beveled portion 55 of the bottom surface 10. In the closed position, the stand is configured to be nested completely within the recess 51 (as shown in FIG. 5), such that the beveled portion 55 of the bottom surface 10 can be laid flat on a table or other flat surface. While the stand 50 is depicted as a substantially planar member, it is anticipated that the stand 50 can be of different sizes and shapes so long as it is retractable and operable to support holder 5 in the raised position.

The disclosed embodiments may be made from materials with semi-rigid or rigid properties to provide durability and support, such as wood or plastics.

Figure 13:
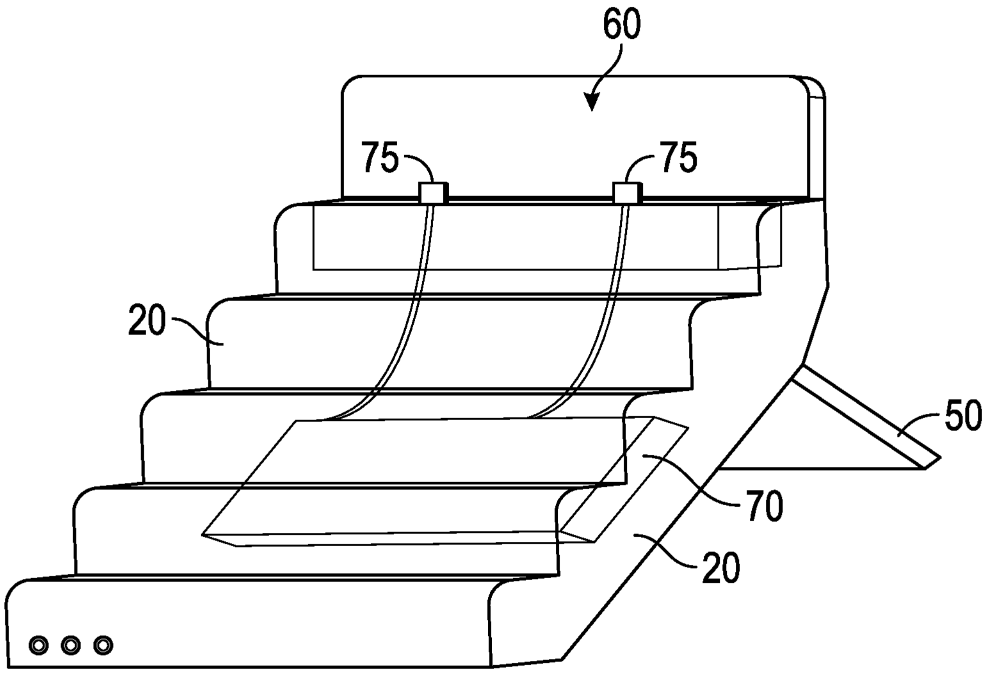
FIG. 13 is a front perspective transparent view of a second showing the support assembly for a portable electronic device, a power source, and a charging station.

Turning to FIG. 13, any of the aforementioned embodiments may further include a support assembly 60 operable to hold a portable electronic device (e.g. smartphones, tablets, or other compact portable viewing device). Preferably, the support assembly 60 is attached at the top edge top edge 17 of the back surface 15 and operable to raise the viewing screen on the portable electronic device above any pull-tabs 1 when the holder 5 is in use. The support assembly 60 may also be a removable component.

As shown in FIG. 13, any of the aforementioned embodiments may further include a power source 70 connected to and operable to provide power to an external charging station 75. The external charging stations include USB ports or any other type of port capable of charging a portable electronic device.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A game card holder comprising:

a power source and a charging station, a back surface having a bottom edge and a top edge, a bottom surface extending from the bottom edge to a front edge, the bottom surface comprising a first segment extending from the front edge and a second segment that is angularly offset from the first segment, opposing sides, a front viewing portion comprising at least one slot operable to hold a game card, and a retractable stand positioned along the second segment of the bottom surface, wherein the retractable stand is operable to raise the second segment of the bottom surface from a horizontal position to a raised position when in an open position, wherein the front viewing portion comprises a front surface extending from the front edge of the bottom surface to said top edge of the back surface.

2. The gamecard holder of claim 1 wherein the front viewing portion comprises at least one step.

3. The gamecard holder of claim 1 wherein each slot comprises a depth configured to hold a plurality of game cards.

4. The gamecard holder of claim 1 wherein the second segment of the bottom surface comprises a recess sized and dimensioned to receive the stand when in a closed position such that the stand is nested within the recess.

5. The gamecard holder of claim 1 comprising a support assembly operable to hold a portable electronic device.

6. The gamecard holder of claim 1 wherein the charging station is configured to provide power to a portable electronic device.

* * * * *